Figures 1, 2:
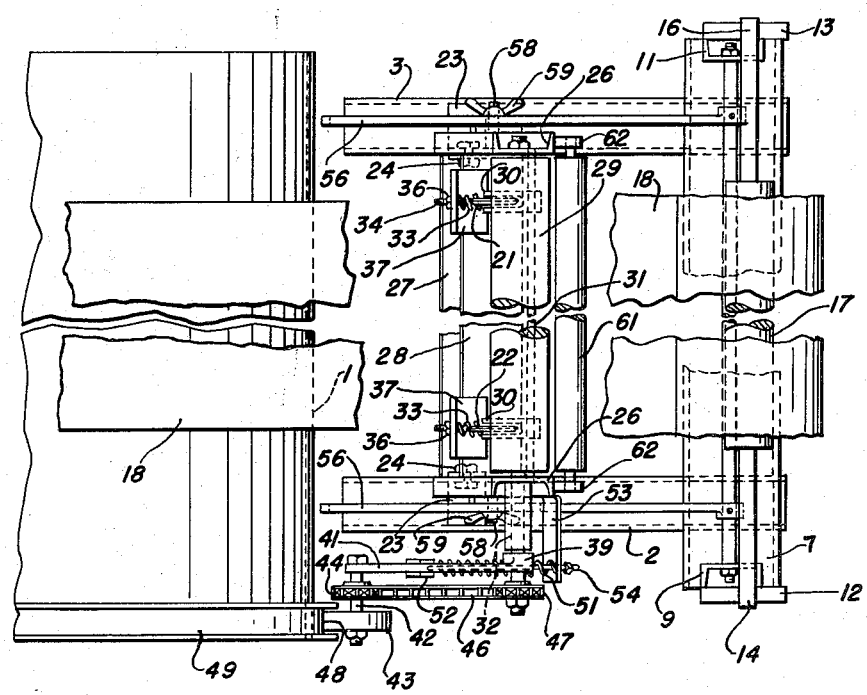

Aug. 10, 1954  E. N. BRODEN  2,685,926
DEVICE FOR SALVAGING IN THE MANUFACTURE OF RUBBER THREAD
Filed June 2, 1951

INVENTOR.
EDWIN N. BRODEN
BY
Ely & Frye
ATTORNEYS

Patented Aug. 10, 1954

2,685,926

UNITED STATES PATENT OFFICE 2,685,926

**DEVICE FOR SALVAGING IN THE MANUFAC-
TURE OF RUBBER THREAD**

Edwin N. Broden, Assonet, Mass., assignor to The
Firestone Tire & Rubber Company, Akron,
Ohio, a corporation of Ohio Application June 2, 1951, Serial No. 229,616

3 Claims. (Cl. 164—65)

This invention relates in general to the manufacture of rubber thread and, in particular, to one phase thereof wherein a trimming operation on uncured stock represents appreciable savings over prior practice.

In one form of manufacture of rubber threads, the compounded rubber is calendered in sheet form and reeled onto a spool, from whence it is subsequently reeled onto a large curing drum and placed in an autoclave for vulcanizing. After vulcanizing, the sheet is transferred to a temporary holding reel, from whence it is reeled onto a large cutting drum. At the cutting drum, a rotating knife cuts through all layers of the sheet on the drum while moving steadily in a direction axially of the drum, producing a helical cut.

The calendered sheet is not uniform in width, nor are its edges strictly rectilinear. For these and other reasons having to do with the several transfers of the stock from reel to roll and from roll to reel, there has in the past been considerable departure from alignment of the edges of the several layers of cured sheet on the cutting drum. Since the rubber thread must be continuous and the knife cuts through several layers, all material lying outside the innermost point on the edges of the sheet layers must be scrapped, at each end of the sheet material on the drum. Since the material is vulcanized, it can only be re-used in a reclaiming operation.

I have found that by trimming the sheet as it is fed onto the curing drum, it is wound thereon with edges exactly aligned, and this condition can be maintained reasonably well in subsequent transfers culminating in the winding of the sheet on the cutting drum. By this method, the amount of scrap from the cured sheet on the cutting drum is greatly reduced, the saving of material being effected at the stage where the trimming operation is performed. Since at this stage the stock is uncured, the material of the salvaged edges can be returned to the calenders for re-working.

It is therefore an object of the invention to minimize waste of cured material in the drum cutting of rubber-threads. Another object is to trim rubber sheet material intended for drum-cutting into rubber threads prior to vulcanization thereof. A further object is to trim rubber sheet material prior to drum curing so that the trimmings may be re-worked into sheet form and the cured sheet may be evenly reeled onto a cutting drum. A still further object is to provide means to accomplish such a trimming operation.

These and other ends are attained by the present invention, the trimming apparatus related thereto being described in the following specification and illustrated in the drawings, in which:

Fig. 1 is a top plan view of the trimming mechanism showing adjacent apparatus including part of a curing drum and a guide roll for sheet being fed from a supply spool, and Fig. 2 is an end elevational view of Fig. 1, as seen from the bottom thereof.

Referring to the drawings by characters of reference, there is shown a conventional curing drum 1, which, as understood in the art, has spindles suitably journaled for rotation of the drum and a drive means for rotating the drum to reel uncured, calendered sheet thereon. Two lengths of channel 2, 3, suitably secured to the floor 4 provide support for the trimmer mechanism, indicated as a whole by the numeral 6. Also supported on the channels is a transversely arranged channel 7 bearing upright channels 9, 11. The latter, at their tops, have respective, horizontal plates 12, 13 with semi-circular slots in their upper edges journaling the ends 14, 16 of the spindle of a supply roll 17 on which the calendered sheet is wound.

Trimmer mechanism 6 includes two rotary knives 21, 22, one for trimming each edge of the sheet 18. Except for the driving elements, the support is symmetrical about the longitudinal center line of sheet 18 and, therefore, only one side (lower side in Fig. 1) will be described; similar reference numerals being used for similar elements on each half of the support. Thus, channel 2 has bolted to its upper face a bracket 23 carrying a bolt 24 to which is pivoted an arm 26 of channel section. Respective arms 26 are joined by two channel sections 27, 28. A backing roller 29 for knives 21, 22 has a spindle 32 journaled in arms 26 near the upper ends thereof. Knives 21, 22 are arranged to contact roller 29 and each knife is rotatably mounted in a fork member 30 pivoted on a shaft 31 journaled in and extending between arms 26. The knives are resiliently urged against roller 29 by means of a tension spring 33 anchored at one end on an adjustable screw 34 threaded in a bracket 37 on channel 28 and secured by a lock nut 36, the spring being attached at its other end to an arm 38 extending from fork 31 and forming a bell crank therewith.

Spindle 32 extends considerably outward from channel 26 (lower end of Fig. 1) and carries near its end a rotatable hub 39 having a radial arm 41 with a stub shaft 42 to which is keyed a drive wheel 43. Also keyed to shaft 42 is a sprocket 44 engaging a chain 46 which drives a sprocket 47 on shaft 32 to drive roller 29.

Drive wheel 43 is adapted to contact the bottom 48 of a channel collar 49 peripherally arranged on drum 1 near one end thereof. The drive wheel is brought into engagement with the channel bottom 48 by swinging assembly 6 on pivots 24 and is resiliently held against the channel bottom by a compression spring 51 acting between a bracket 52 on arm 41 and a bracket 53 on arm 26. A guide rod 54 is located within spring 51, being attached to bracket 52 and slidable through bracket 53.

Assembly 6 is held in either driving or idle position by means of bars 56 secured by set screws to a shaft rotatably mounted in upright channels 9, 11, and having slots 57 receiving a bolt 58 carried by arm 26 and secured by a wing nut 59.

The sheet 18, as it leaves roll 17, passes over a roller 61 journaled in bracket 62 on uprights 26 and thence under roller 29, from where it passes to drum 1. In passing under roller 29, the edges of the sheet are trimmed square and parallel by rotary knives 21, 22. In Fig. 1, the irregularities in the edges of sheet 18 have been exaggerated, to heighten the contrast to the straight edges of the sheet after it passes the cutting discs. The salvaged material may be collected in any suitable manner, as by receiving it in a box.

The drive is arranged to give to roller 29 about the same peripheral speed as drum 1 and, to this end, bottom 48 of channel 49 is located radially of the drum so as to correspond with about the middle layer of windings on drum 1 to provide an average of the surface speed of sheet 18.

While a certain embodiment has been shown and described, the invention is not limited thereby since changes in the size, shape, character or arrangement, for instance, of the various parts may be resorted to without departing from the spirit or scope of the appended claims.

What is claimed is:

1. In combination, a curing drum on which a sheet of calendered rubber is adapted to be wound, said drum having a peripheral channel near one end, a framework adjacent the drum having a roll with axis parallel to that of said drum, a pair of rotary knives with cutting edges and resilient means urging said knives into contact with said roll, an arm coaxially mounted with said roll for swinging motion, a roller on the distal end of said arm adapted to contact said peripheral channel on said drum, resilient means urging said roller into contact with said drum, and drive means between said roll and said roller, said framework being mounted for swinging motion to and from said drum.

2. In combination, a curing drum on which a sheet of calendered rubber is adapted to be wound, a framework adjacent the drum having a roll with axis parallel to that of said drum, a pair of rotary knives with cutting edges contacting said roll, an arm coaxially mounted with said roll for swinging motion, a roller on the distal end of said arm adapted to contact said drum, and drive means between said roll and said roller, said framework being mounted for swinging motion to and from said drum.

3. In combination, a curing drum on which a sheet of calendered rubber is adapted to be wound, a framework adjacent the drum having a roll with axis parallel to that of said drum, a pair of rotary knives with cutting edges and resilient means urging said knives into contact with said roll, an arm coaxially mounted with said roll for swinging motion, a roller on the distal end of said arm adapted to contact said drum, and drive means between said roll and said roller.

References Cited in the file of this patent

UNITED STATES PATENTS

| Number | Name | Date |
|---|---|---|
| 409,408 | Lacroix | Aug. 20, 1889 |
| 1,089,467 | Gammeter | Mar. 10, 1914 |
| 1,402,160 | Gwozdz | Jan. 3, 1922 |
| 1,419,174 | Sherman et al. | June 13, 1922 |
| 1,651,837 | Richey | Dec. 6, 1927 |
| 1,764,665 | Wennerberg | June 17, 1930 |
| 2,316,283 | Piperoux et al. | Apr. 13, 1943 |